US012778349B2

(12) United States Patent
Du et al.

(10) Patent No.: US 12,778,349 B2
(45) Date of Patent: Nov. 3, 2026

(54) PULPING DEVICE

(71) Applicant: SHANGSHUI SMARTECH LTD., Shenzhen (CN)

(72) Inventors: Baodong Du, Shenzhen (CN); Jian Ke, Shenzhen (CN); Xudong Jin, Shenzhen (CN); Qiao Shi, Shenzhen (CN)

(73) Assignee: SHANGSHUI SMARTECH LTD., Shenzhen (CN)

( * ) Notice: Subject to any disclaimer, the term of this patent is extended or adjusted under 35 U.S.C. 154(b) by 434 days.

(21) Appl. No.: 18/512,919

(22) Filed: Nov. 17, 2023

(65) Prior Publication Data

US 2024/0341534 A1 Oct. 17, 2024

(30) Foreign Application Priority Data

Apr. 12, 2023 (CN) ......................... 202320880077.7

(51) Int. Cl.
*A47J 43/00* (2006.01)
*A47J 43/046* (2006.01)
*A47J 43/07* (2006.01)

(52) U.S. Cl.
CPC ......... *A47J 43/0722* (2013.01); *A47J 43/046* (2013.01)

(58) Field of Classification Search
CPC . B01F 27/271; B01F 27/2711; A47J 43/0722; A47J 43/046
See application file for complete search history.

(56) References Cited

U.S. PATENT DOCUMENTS

2009/0098266 A1* 4/2009 Briz .......................... C02F 1/34 44/605
2022/0062852 A1 3/2022 Enomura

FOREIGN PATENT DOCUMENTS

| | | | |
|---|---|---|---|
| CN | 113499698 | A | 10/2021 |
| CN | 218834318 | U | 4/2023 |
| DE | 673014 | C | 3/1939 |
| GB | 646591 | A | 11/1950 |
| GB | 780661 | A | 8/1957 |
| JP | S62174627 | U | 11/1987 |
| JP | H11080602 | A | 3/1999 |
| JP | 2012210621 | A | 11/2012 |
| JP | 2017501019 | A | 1/2017 |

(Continued)

OTHER PUBLICATIONS

DE673014C to Eisenwerk Machine Translation (Year: 1939).*

(Continued)

*Primary Examiner* — Anshu Bhatia

(74) *Attorney, Agent, or Firm* — Young Basile Hanlon & MacFarlane, P.C.

(57) ABSTRACT

Provided is a pulping device. The pulping device includes a housing, a drive shaft, and an impeller assembly. The housing defines a cavity. The impeller assembly is disposed in the cavity and is configured to be driven to rotate by the drive shaft. A bottom surface of the impeller assembly is disposed opposite to an end surface of the housing, and one of the bottom surface of the impeller assembly or the end surface of the housing is provided with an annular protrusion, and the other one of the bottom surface of the impeller assembly or the end surface of the housing defines an annular groove matching the annular protrusion, and an interference-proof clearance is defined between an outer wall of the annular protrusion and an inner wall of the annular groove.

16 Claims, 5 Drawing Sheets

(56) References Cited

FOREIGN PATENT DOCUMENTS

| | | | |
|---|---|---|---|
| JP | 2023021641 | A | 2/2023 |
| KR | 20060131790 | A | 12/2006 |
| WO | 2019011963 | A1 | 1/2019 |

OTHER PUBLICATIONS

Request for the Submission of an Opinion and English translation issued in corresponding KR application No. 2024-0047767 dated Nov. 17, 2025. 12 pages.

Extended European Search Report issuned in corresponding EP Application No. 24167663.4, dated Dec. 12, 2024, 8 pages.

Notice of Reasons for Refusal issued in corresponding JP Application No. 2024-062649, dated Mar. 6, 2025, 10 pages.

* cited by examiner

PULPING DEVICE

CROSS-REFERENCE TO RELATED APPLICATION(S)

This application claims priority to Chinese Patent Application No. 202320880077.7, filed Apr. 12, 2023, the entire disclosure of which is incorporated herein by reference.

TECHNICAL FIELD

This disclosure relates to the field of pulping technologies, and in particular, to a pulping device.

BACKGROUND

In the fields such as industry and food, a pulping device is generally used to mix powder and liquid to obtain pulp. The existing pulping device has a large clearance between a mixing impeller assembly and a bottom wall of a housing, and some liquid flows through the clearance and is discharged through a liquid outlet without mixing with the powder, thereby affecting the mixing quality of the pulp.

SUMMARY

The disclosure provides a pulping device, the pulping device includes a housing, a drive shaft, and an impeller assembly. The housing defines a cavity. The impeller assembly is disposed in the cavity and configured to be driven to rotate by the drive shaft. A bottom surface of the impeller assembly is disposed opposite to an end surface of the housing. One of the bottom surface of the impeller assembly or the end surface of the housing is provided with an annular protrusion, the other one of the bottom surface of the impeller assembly or the end surface of the housing defines an annular groove matching the annular protrusion, and an interference-proof clearance is defined between an outer wall of the annular protrusion and an inner wall of the annular groove.

BRIEF DESCRIPTION OF THE DRAWINGS

The accompanying drawings, which are incorporated into the specification and constitute a part of the specification, illustrate embodiments consistent with the disclosure and together with the description, serve to explain principles of the disclosure.

DETAILED DESCRIPTION

Figure 1:
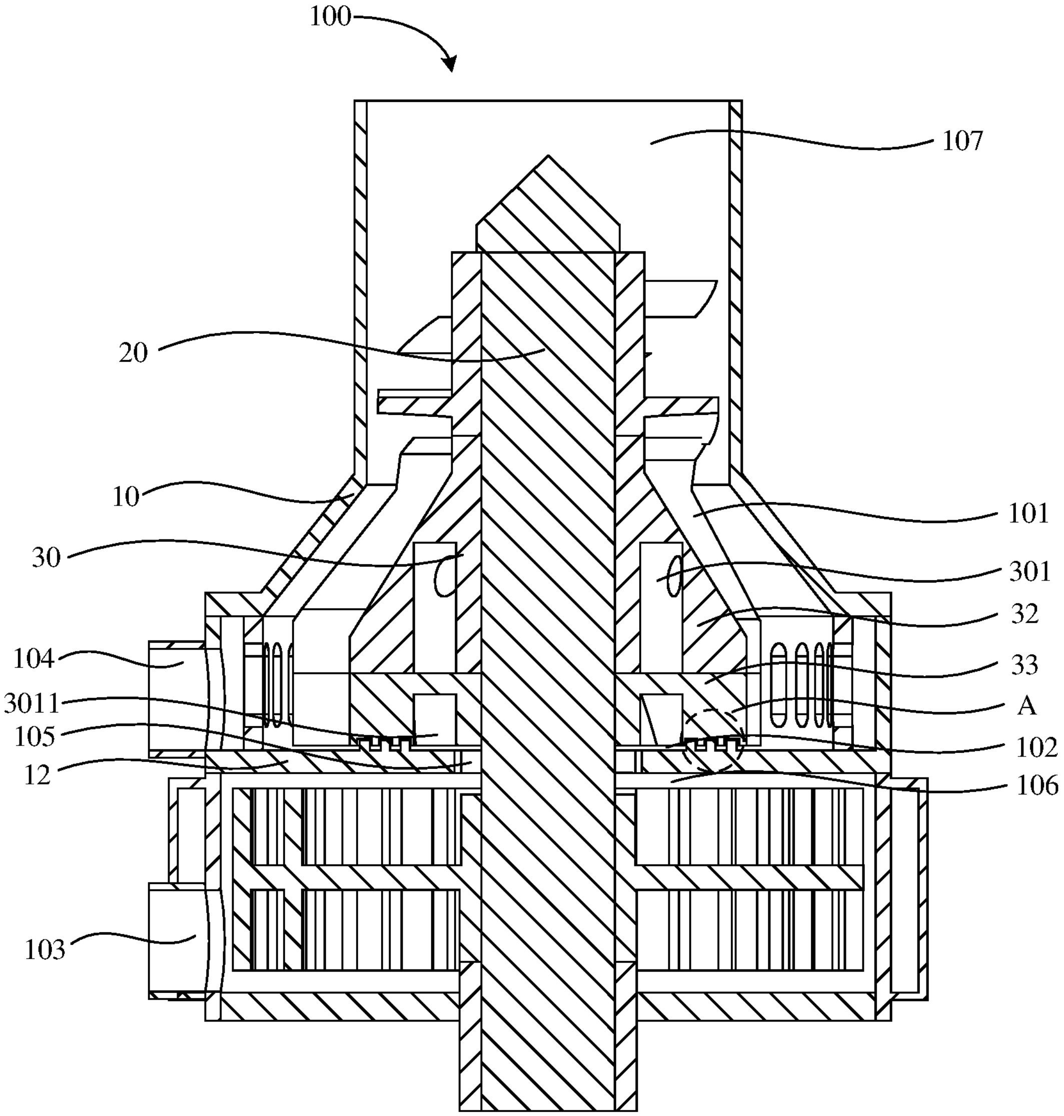
FIG. 1 is a sectional diagram of a pulping device provided by an embodiment of the disclosure.
Figure 2:
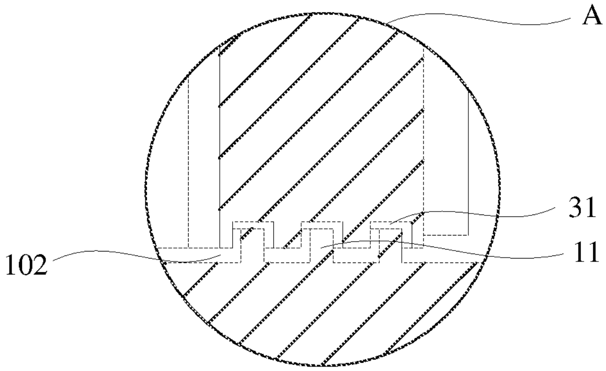
FIG. 2 is an enlarged diagram of a pulping device provided by an embodiment of FIG. 1 at A.

The pulping device of embodiments of the disclosure will be described in detail with reference to FIG. 1 to FIG. 8. Under the condition of no conflict, the following embodiments and features in the embodiments can complement each other or be combined with each other.

The disclosure provides a pulping device 100. The pulping device includes a housing 10, a drive shaft 20 and an impeller assembly 30. The housing 10 defines a cavity 101, the drive shaft 20 is disposed in the cavity 101, and the impeller assembly 30 is disposed in the cavity 101 and is configured to be driven to rotate by the drive shaft 20.

A bottom surface of the impeller assembly 30 is disposed opposite to an end surface of the housing 10, one of the bottom surface of the impeller assembly 30 or the end surface of the housing 10 is provided with an annular protrusion 11, the other one of the bottom surface of the impeller assembly 30 or the end surface of the housing 10 defines an annular groove 31 matching the annular protrusion 11, and an interference-proof clearance 102 is defined between an outer wall of the annular protrusion 11 and an inner wall of the annular groove 31.

The annular protrusion 11 and the annular groove 31 matching the annular protrusion 11 are disposed on the bottom surface of the impeller assembly 30 and the end surface of the housing 10 to form a labyrinthine sealing structure, which can prevent liquid which does not participate in mixing from flowing out of a liquid outlet directly after passing through the clearance 102 due to an excessive clearance between the bottom surface of the impeller assembly 30 and the end surface of the housing 10. By means of the annular protrusion 11 and the matching annular groove 31, the flow path of the liquid can be changed, so that the liquid flows to the impeller assembly 30 as much as possible and participates in powder mixing, which is configured to improve the mixing efficiency and ensure mixing quality.

In an embodiment, as illustrated in FIG. 1, the housing 10 of the pulping device 100 defines a liquid inlet 103 in a bottom side wall of the housing 10, the housing 10 defines a liquid outlet 104 in a middle side wall of the housing 10, and the housing 10 defines a feed inlet 107 on the top. Liquid enters the cavity 101 through the liquid inlet 103, powder enters the cavity 101 through the feed inlet 107, the powder is dispersed by the impeller assembly 30 and then is mixed with the liquid, and pulp formed after mixing flows out through the liquid outlet 104.

Figure 4:
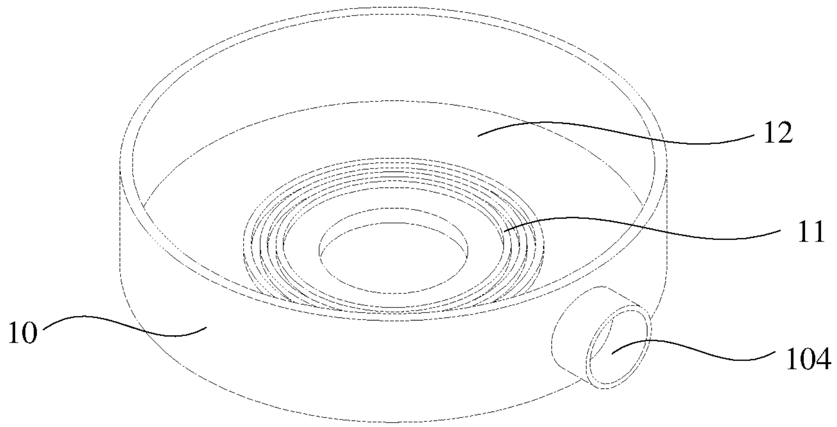
FIG. 4 is a structural schematic diagram of a support plate and part of a housing provided by an embodiment of the disclosure.
Figure 5:
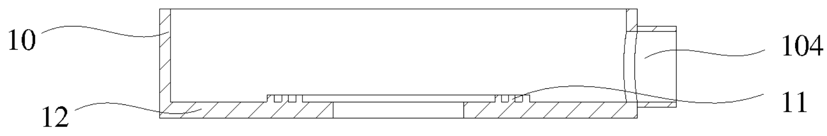
FIG. 5 is a sectional diagram of a support plate and part of a housing provided by the embodiment illustrated in FIG. 4.

In an embodiment, as illustrated in FIGS. 1, 4, and 5, the housing 10 is provided with a support plate 12, one of the bottom surface of the impeller assembly 30 or an upper surface of the support plate 12 is provided with an annular protrusion 11, and the other of the bottom surface of the impeller assembly 30 or the upper surface of the support plate 12 defines the annular groove 31 matching the annular protrusion 11. By disposing the support plate 12, the cavity 101 is divided into two parts, an upper part and a lower part, the impeller assembly 30 is disposed in a part of the cavity 101 above the support plate 12, and other components can be disposed in a part of the cavity 101 below the support plate 12 such as a dispersion cylinder for dispersing pulp. The liquid outlet 104 is defined above the support plate 12. The pulp can flow out directly through the liquid outlet 104 after being mixed by the impeller assembly 30, which is quick and convenient.

In an embodiment, as illustrated in FIG. 1, the drive shaft 20 passes through the support plate 12, a second flow channel 105 is defined between the drive shaft 20 and the support plate 12, and a third flow channel 106 is defined below the support plate 12. The liquid entering from the liquid inlet 103 can pass through the third flow channel 106 and the second flow channel 105 in sequence and then enter the cavity 101 above the support plate 12.

In an embodiment, as illustrated in FIG. 1, the impeller assembly 30 defines a first flow channel 301, the first flow channel 301 extends through a bottom surface of the impeller assembly 30 and a side surface of the impeller assembly 30, and the first flow channel 301 communicates with the cavity 101. Since the annular protrusion 11 and the annular groove 31 are disposed on the bottom surface of the impeller assembly 30 and the end surface of the housing 10, the annular protrusion 11 and the annular groove 31 cooperatively prevent the liquid from flowing, and thus by defining the first flow channel 301, a passage for the liquid to flow can be provided, which facilitates the liquid to flow to the top and side of the impeller assembly 30 to participate in mixing with the powder.

In an embodiment, as illustrated in FIG. 1, the first flow channel 301 has an opening 3011 on the bottom surface of the impeller assembly 30, and a distance between the opening 3011 and the drive shaft 20 is less than a radius of the annular protrusion 11. As such, after the liquid enters the clearance 102 between the bottom surface of the impeller assembly 30 and the end surface (or the upper surface of the support plate 12) of the housing 10, the liquid enters the first flow channel 301 through the opening 3011 on the bottom surface of the impeller assembly 30, which can more effectively prevent the liquid from passing through the clearance 102 directly and flowing out of the liquid outlet 104 without participating in mixing.

In an embodiment, as illustrated in FIG. 1, the impeller assembly 30 includes a mixing impeller 32, one of a bottom surface of the mixing impeller 32 or the end surface of the housing 10 is provided with the annular protrusion 11, and the other one of the bottom surface of the mixing impeller 32 or the end surface of the housing 10 defines the annular groove 31 matching the annular protrusion 11. When the powder falls down from the feed inlet 107, the mixing impeller 32 is able to break up lumps in the falling powder, and after the powder is in contact with the liquid, the mixing impeller 32 stirs a liquid mixture of the powder and the liquid, thereby obtaining a pulp with better mixing effect.

When the support plate 12 is disposed in the housing 10, one of the bottom surface of the mixing impeller 32 or the upper surface of the support plate 12 is provided with the annular protrusion 11, and the other one of the bottom surface of the mixing impeller 32 or the upper surface of the support plate 12 defines the annular groove 31 matching the annular protrusion 11.

Figure 6:
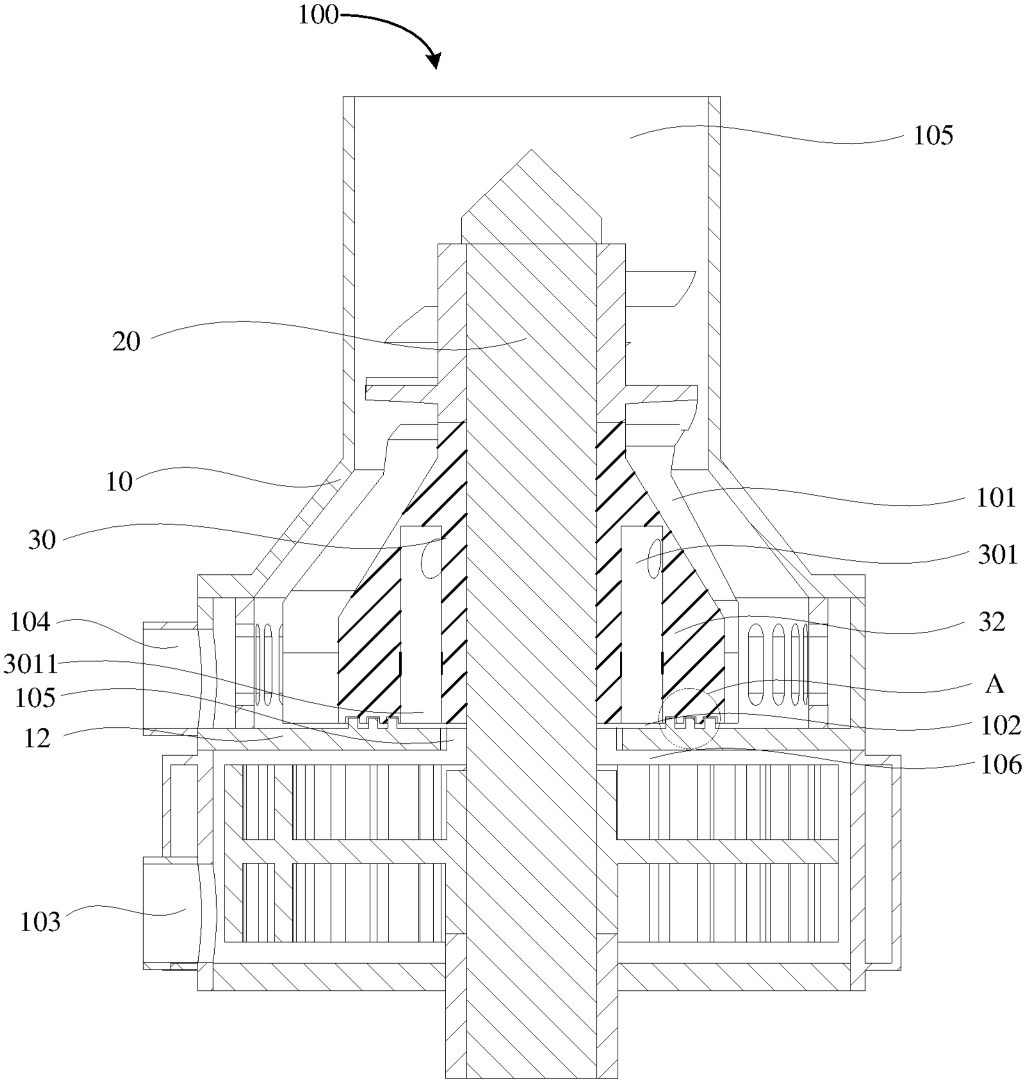
FIG. 6 is a sectional diagram of a pulping device provided by another embodiment of the disclosure.

In an embodiment, as illustrated in FIG. 6, the impeller assembly 30 includes the mixing impeller 32 and a guide impeller 33, the guide impeller 33 is disposed below the mixing impeller 32, and one of a bottom surface of the guide impeller 33 or the end surface of the housing 10 is provided with the annular protrusion 11, and the other one of the bottom surface of the guide impeller 33 or end surface of the housing 10 defines the annular groove 31 matching the annular protrusion 11. The guide impeller 33 is able to guide the liquid to flow above the mixing impeller 32, thereby facilitating mixing of the liquid and the powder.

When the support plate 12 is disposed in the housing 10, one of the bottom surface of the guide impeller 33 or the upper surface of the support plate 12 is provided with the annular protrusion 11, and the other one of the bottom surface of the guide impeller 33 or the upper surface of the support plate defines the annular groove 31 matching the annular protrusion 11.

Figure 7:
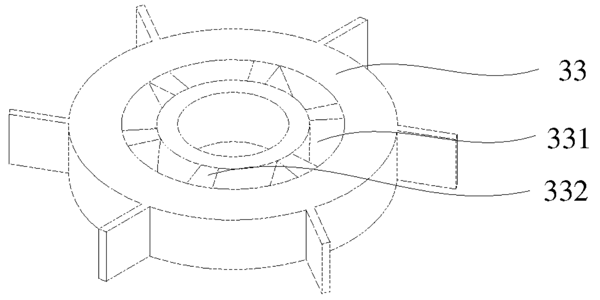
FIG. 7 is a schematic structural diagram of a guide impeller provided by an embodiment of the disclosure.
Figure 8:
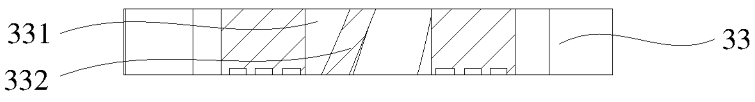
FIG. 8 is a sectional diagram of a guide impeller provided by the embodiment of FIG. 7.

In an embodiment, as illustrated in FIGS. 7 and 8, the guide impeller 33 defines a guide flow channel 331 disposed around a central axis of the guide impeller 33, and a guide vane(s) 332 is disposed in the guide flow channel 331. The guide vane(s) 332 of the guide impeller 33 is disposed obliquely. When the guide impeller 33 rotates, the guide impeller 33 attracts the liquid below the guide impeller 33, and attracts the liquid into the guide flow channel 331 and to flow into the first flow channel 301.

In an embodiment, a dimension of a clearance between the outer wall of the annular protrusion 11 and the inner wall of the annular groove 31 is in a range of 0.05 mm-0.5 mm. In this way, the clearance is small, and the liquid can be prevented from flowing out through the clearance effectively.

In an embodiment, a cross section of the annular protrusion 11 is rectangular, triangular, semicircular, trapezoidal or irregular, and a cross section of the annular groove 31 is rectangular, triangular, semicircular, trapezoidal or irregular. For example, the cross section of the annular protrusion 11 is semicircular, the cross section of the annular groove 31 is semicircular, and the semicircular annular protrusion 11 and the semicircular annular groove 31 each have a simple structure and are easy to be manufactured.

In an embodiment, multiple annular protrusions 11 and multiple annular grooves 31 are provided. The multiple annular protrusions are coaxial and spaced apart from one another, and the multiple annular grooves 31 correspond to the multiple annular protrusions 11, and are coaxial and spaced apart from one another. In the illustrated embodiment, in a direction from the drive shaft 20 to a side wall of the housing 10, radii of the multiple annular protrusions 11 sequentially increases, and radii of the multiple annular groove 31 sequentially increases. The multiple annular protrusions 11 and the multiple annular grooves 31 cooperate with each other to improve the sealing performance of the clearance 102 and reduce the flow of liquid passing through the clearance 102.

In an embodiment, cross sections of the multiple annular protrusions 11 are in the shape of any one or any combination of rectangle, triangle, semicircle, trapezoid, or irregular shapes, and cross sections of the multiple the annular grooves 31 are in the shape of any one or any combination of rectangle, triangle, semicircle, trapezoid, or irregular shapes. Cross sections of the annular protrusion 11 and the annular groove 31 adjacent to the annular protrusion 11 may be the same in shape, for example, both rectangular. Cross sections of annular protrusion 11 and the annular groove 31 adjacent to the annular protrusion 11 may also be different in shape, for example, the cross section of the annular protrusion 11 is rectangular, and the cross section of the annular groove 31 adjacent to the annular protrusion 11 is semi-circular.

Figure 3:
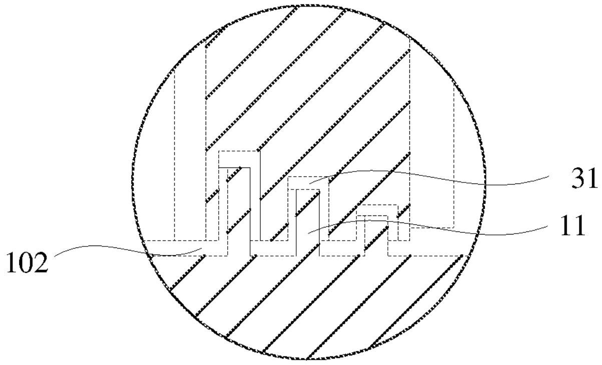
FIG. 3 is a schematic structural diagram of an annular protrusion and an annular groove provided by an embodiment of the disclosure.

In an embodiment, as illustrated in FIG. 3, in the direction from the drive shaft 20 to a side wall of the housing 10, radii of the multiple annular protrusions 11 successively increase, heights of the multiple annular protrusions 11 successively decrease, and depths of the multiple annular grooves 31 successively decrease correspondingly. After the liquid enters the clearance 102, the liquid firstly enters between the annular protrusion 11 with the smallest radius and the annular groove 31 with the smallest radius. Setting the annular protrusion 11 with the smallest radius higher is more conducive to preventing the liquid from entering between the outer wall of the annular protrusion 11 and the inner wall of the annular groove 31, thereby preventing the liquid from flowing through the clearance 102.

In an embodiment, in the direction from the drive shaft 20 to a side wall of the housing 10, radii of the multiple annular protrusions 11 successively increase, heights of the multiple annular protrusions 11 successively increase, and depths of the multiple annular grooves 31 successively increase correspondingly. After the liquid enters the clearance 102, the liquid moves in a direction from the drive shaft 20 to the side wall of the housing 10, and annular protrusions 11 with successively increase height are more conducive to preventing the liquid from flowing through the clearance 102.

A specific working flow of the pulping device provided in the disclosure is as follows.

As illustrated in FIG. 6, liquid enters the cavity 101 of the housing 10 through the liquid inlet 103, the liquid flows through the third flow channel 106 and the second flow channel 105 in sequence, and then enters the guide flow channel 331 under the attraction force provided by the guide impeller 33. Some of the liquid enters the clearance 102, and due to the obstruction of the annular protrusion 11 and the annular groove 31, the liquid hardly flows out through the clearance 102. The liquid entering the guide flow channel 331 continues to flow upwards and enters the first flow channel 301, and then flows out of the impeller assembly 30 to the top and side of the impeller assembly. The powder enters the cavity 101 through the feed inlet 107 and then contacts with the liquid, the impeller assembly 30 mixes and stirs the liquid and the powder to obtain pulp, and the pulp finally flows out through the liquid outlet 104.

The above are merely preferred embodiments of the disclosure, and is not a limitation to the disclosure in any form. Although the disclosure has been disclosed with the preferred embodiments as above, the above embodiments are not intended to limit the disclosure, any person skilled in the art can make some changes or modifications to equivalent embodiments without departing from the scope of the technical solutions of the disclosure, However, according to the technical essence of the disclosure, any simple modification, equivalent change, and modification made without departing from the technical solution of the disclosure to the above embodiments all belong to the scope of the technical solutions of the disclosure.

The disclosure of this patent document contains material that is subject to copyright protection. The copyright belongs to the copyright owner. The copyright owner has no objection to reproduction by anyone of the patent document or the disclosure form the official records and archives of the Patent and Trademark Office.

What is claimed is:

1. A pulping device, comprising:

a housing defining a cavity;

a drive shaft;

an impeller assembly, disposed in the cavity, is configured to be driven to rotate by the drive shaft; wherein a bottom surface of the impeller assembly is disposed opposite to an end surface of the housing; and a first one of the bottom surface of the impeller assembly or the end surface of the housing is provided with an annular protrusion, a second one of the bottom surface of the impeller assembly or the end surface of the housing defines an annular groove matching the annular protrusion, and an interference-proof clearance is defined between an outer wall of the annular protrusion and an inner wall of the annular groove;

wherein the housing defines a liquid inlet in a bottom side wall of the housing, a liquid outlet in a middle side wall of the housing, and a feed inlet on top of the pulping device.

2. The pulping device of claim 1, wherein a dimension of the clearance between the outer wall of the annular protrusion and the inner wall of the annular groove is in a range of 0.05 mm-0.5 mm.

3. The pulping device of claim 1, wherein a cross section of the annular protrusion is rectangular, triangular, semicircular, trapezoidal, or irregular, and a cross section of the annular groove is rectangular, triangular, semicircular, trapezoidal, or irregular.

4. The pulping device of claim 1, wherein the annular protrusion comprises a plurality of annular protrusions, the annular groove comprises a plurality of annular grooves, the plurality of annular protrusions are coaxial and spaced apart from one another, and the plurality of annular grooves correspond to the plurality of annular protrusions and are coaxial and spaced apart from one another.

5. The pulping device of claim 4, wherein cross sections of the plurality of annular protrusions are in a shape of any one or any combination of rectangle, triangle, semicircle, trapezoid, or irregular shapes, and cross sections of the plurality of the annular grooves are in a shape of any one or any combination of rectangle, triangle, semicircle, trapezoid, or irregular shapes.

6. The pulping device of claim 4, wherein in a direction from the drive shaft to a side wall of the housing, radii of the plurality of annular protrusions successively increase, heights of the plurality of annular protrusions successively decrease, and depths of the plurality of annular grooves successively decrease correspondingly.

7. The pulping device of claim 4, wherein in a direction from the drive shaft to a side wall of the housing, radii of the plurality of annular protrusions successively increase, heights of the plurality of annular protrusions successively increase, and depths of the plurality of annular grooves successively increase correspondingly.

8. The pulping device of claim 1, wherein the impeller assembly comprises a mixing impeller, a first one of a bottom surface of the mixing impeller or the end surface of the housing is provided with the annular protrusion, and a second one of the bottom surface of the mixing impeller or the end surface of the housing defines the annular groove matching the annular protrusion.

9. The pulping device of claim 8, wherein the housing is provided with a support plate, a first one of the bottom surface of the mixing impeller or an upper surface of the support plate is provided with the annular protrusion, and a second one of the bottom surface of the mixing impeller or the upper surface of the support plate defines the annular groove matching the annular protrusion.

10. The pulping device of claim 1, wherein the impeller assembly comprises a mixing impeller and a guide impeller, the guide impeller is disposed below the mixing impeller; a first one of a bottom surface of the guide impeller or the end surface of the housing defines the annular protrusion, and a second one of the bottom surface of the guide impeller or the end surface of the housing defines the annular groove matching the annular protrusion.

11. The pulping device of claim 10, wherein the housing is provided with a support plate, a first one of the bottom surface of the guide impeller or an upper surface of the support plate is provided with the annular protrusion, and a second one of the bottom surface of the guide impeller or the upper surface of the support plate defines the annular groove matching the annular protrusion.

12. The pulping device of claim 10, wherein the guide impeller defines a guide flow channel around a central axis of the guide impeller, and a guide vane is disposed in the guide flow channel.

13. The pulping device of claim 1, wherein the housing is provided with a support plate, a first one of the bottom surface of the impeller assembly or an upper surface of the support plate is provided with the annular protrusion, and a second one of the bottom surface of the impeller assembly or the upper surface of the support plate defines the annular groove matching the annular protrusion.

14. The pulping device of claim 13, wherein a flow channel is defined between the drive shaft and the support plate, and another flow channel is defined below the support plate.

15. The pulping device of claim 1, wherein the impeller assembly defines a flow channel, the flow channel extends through the bottom surface of the impeller assembly and a side surface of the impeller assembly, and the flow channel communicates with the cavity.

16. The pulping device of claim 15, wherein the flow channel has an opening on the bottom surface of the impeller assembly, and a distance between the opening and the drive shaft is less than a radius of the annular protrusion.

* * * * *